United States Patent [19]

Hisatake et al.

[11] Patent Number: 4,622,595
[45] Date of Patent: Nov. 11, 1986

[54] IMAGE DISPLAY UNIT CAPABLE OF TONE REPRODUCTION

[75] Inventors: Masayuki Hisatake; Haruhiko Moriguchi; Toshiharu Inui; Akio Noguchi, all of Ebina, Japan

[73] Assignee: Fuji Xerox Co., Ltd., Tokyo, Japan

[21] Appl. No.: 678,877

[22] Filed: Dec. 6, 1984

[30] Foreign Application Priority Data

Dec. 21, 1983 [JP] Japan ............................... 58-241635

[51] Int. Cl.⁴ ........................ H04N 1/40; H04N 1/21; H04N 1/23
[52] U.S. Cl. ................................. 358/296; 358/280; 358/283
[58] Field of Search .................... 358/280, 283, 298

[56] References Cited

U.S. PATENT DOCUMENTS

| 3,916,096 | 10/1975 | Everett et al. | 358/283 |
| 4,245,258 | 1/1981 | Holladay | 358/283 |
| 4,389,677 | 6/1983 | Rushby et al. | 358/280 |
| 4,485,397 | 11/1984 | Scheuter et al. | 358/298 X |
| 4,491,875 | 1/1985 | Kawamura | 358/298 |

OTHER PUBLICATIONS

Tokunaga, Yukio, "New Gray-Scale Printing Method Using a Thermal Printer", *IEEE Transactions on Electron Devices*, vol. ED-30, No. 8, Aug. 1983.

Primary Examiner—E. A. Goldberg
Assistant Examiner—Patrick W. Foster
Attorney, Agent, or Firm—Kinney & Lange

[57] ABSTRACT

An image reproducing apparatus wherein a halftone of an image is reproduced by repeating a picture element pattern composed of a plurality of dots as a unit and each dot display density of which is gradually controlled. The repetition of the same picture element patterns is avoided to improve tone reproducing performance.

The image display unit includes a means for determining a disposition of dots composing a specific picture element pattern, i.e., display density of each dot in response to tone density of the original image, a means for comparing the disposition of dots of the specific picture element pattern determined by said means with a dot disposition or dispositions of one or plural surrounding picture element pattern or patterns, and a means for changing the dot disposition of said specific picture element pattern in the case when it is identical with dot dispositions of a predetermined number or more of surrounding picture element patterns.

11 Claims, 12 Drawing Figures

IMAGE DISPLAY UNIT CAPABLE OF TONE REPRODUCTION

BACKGROUND OF THE INVENTION (1) Field of the Invention

This invention relates to an image display apparatus capable of reproducing tone by utilizing a picture element pattern composed of a plurality of dots as a unit.

(2) Description of the Prior Art

Heretofore a method for tone reproduction wherein a plurality of dots are used as a unit, and such picture element pattern in which display or recorded density of the respective dots is controlled gradually in response to density of its original image (including any gradation which has not been recorded) is utilized has been known as one of tone reproduction methods. Such method is one wherein when a part of image having a certain tone density is recorded, such a pattern determined unequivocally in response to the tone density is repeatedly expressed or recorded to reproduce the tone of the above part.

As an example, a tone reproduction method to which a 3-level Dither method is applied will be described hereinbelow. Now, explanation will be made of such 3-level Dither method wherein a density level of three gradations of 0 (means no recording), $\frac{1}{2}$, and 1 can be displayed or recorded. In this 3-level Dither method, when density of attention read picture element resides in coordinate position (m, n) of the image in an original, the displaying or recording level of the picture element, the threshold value between recorded density levels of 0 and $\frac{1}{2}$, and the threshold value between recorded density levels of $\frac{1}{2}$ and 1 are I (m, n), P (m, n), a (m, n), and b (m, n), respectively. Relationships between or among them may be expressed as follows.

(1) P (m, n)=0 in case of I (m, n)<a (m, n)
(2) P (m, n)=$\frac{1}{2}$ in case of a (m, n)$\leq$I (m, n)<b (m, n)
(3) P (m, n)=1 in case of b (m, n)$\leq$I (m, n)

According to the above 3-level Dither method, when threshold values a (m, n) and b (m, n) are suitably changed, contrast and density of the image recorded can be changed.

FIG. 1 illustrates an example of picture element pattern wherein as area of a certain tone density is expressed by 3-level Dither method, 2×2 matrix, and FIG. 2 shows a reproduced image of continuous area with the same tone density expressed by utilizing the picture element pattern of FIG. 1.

As is apparent from FIG. 2, the tone reproduced image is composed of vertical lines A and B of two different densities. More specifically, one line A is a vertical line expressed by continuous dots of 1 level density, while the other line B is another vertical line obtained by disposing alternately two types of dots of 0 level and $\frac{1}{2}$ level.

A tone expressed by such two kinds of vertical lines of different density is visually recognized as a striped pattern obtained by repeating said two kinds of lines A and B. Namely, the method as mentioned above involves such problem that a reproduced image having a wide area of uniform tone density cannot be obtained.

Such case of a reproducing image having a wide area of the same tone density is not only accompanied by the problem as mentioned above, but also a tone reproduction wherein the density changes with a small pattern width.

SUMMARY OF THE INVENTION

It is an object of the present invention to provide an image reproducing apparatus wherein a halftone of an image is reproduced by repeating a picture element pattern composed of a plurality of dots as a unit and each dot display density of which is gradually controlled, characterized in that repetition of the same picture element patterns is avoided to improve halftone reproducing performance so that a reproduced image having more favorable quality can be obtained, whereby the above described disadvantage of the prior art can be eliminated.

The characteristic feature of the present invention resides in provision of a means for determining a disposition of dots composing a specific picture element pattern, i.e., display density of each dot in response to tone density of the original image, a means for comparing the disposition of dots of the specific picture element pattern determined by said means with a dot disposition or dispositions of one or plural surrounding picture element pattern or patterns, and a means for changing the dot disposition of said specific picture element pattern in the case when it is identical with dot dispositions of a predetermined number or more of surrounding picture element patterns in an image display unit reproducing tone of image by utilizing a picture element pattern composed of a plurality of dots as a unit.

DETAILED DESCRIPTION OF THE INVENTION

Figure 3:
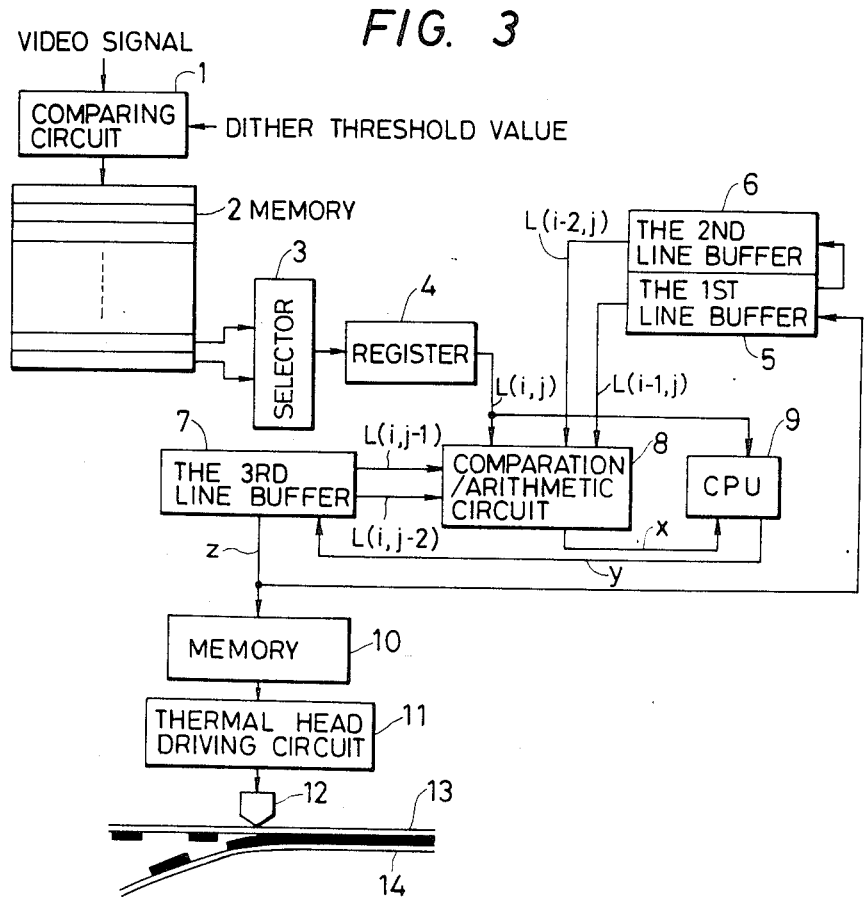
FIG. 3 is a block diagram illustrating an embodiment of the present invention.

The present invention will be described hereinbelow in connection with an embodiment. FIG. 3 illustrates the embodiment wherein the present invention is applied to a transfer thermal printing device, but the invention of course, is not limited thereto.

In this case, it is assumed that such apparatus can reproduce the tone of image by utilizing 2×2 matrix in accordance with 3-level Dither method. In 2×2 matrix 3-level Dither method, as is well known, displaying manner or display density of each picture element is difined by three types of elements, i.e., full dot (●), half dot (◖), and "not printed". When such three types of picture elements or dots are expressed by 2 bit information "11", "01", and "00", each dot or picture element in video information of an original has 2 bit information.

In FIG. 3, image of an original is read by a well known means (not shown) in every picture elements in accordance with main and subsidiary scanning, whereby the image is converted into electrical signals. The picture signals thus signalized are compared with 2×2 matrix, 3-level Dither threshold value in a comparing circuit 1 and stored in a memory 2 by means of the above-mentioned bit information of 2 bits per 1 dot (1 picture element). The memory 2 has a capacity for storing bit information of 2 or more scanning lines.

Thus if 1 scanning line consists of N dots (picture elements), a video signal for 1 scanning line is expressed by 2N bits. Furthermore since a 2×2 matrix corresponds to the above-mentioned picture element pattern, it becomes possible to express the picture element pattern by means of two continuous 2 scanning lines, besides the respective 2×2 matrices are expressed by 8 bits.

Figure 4A:
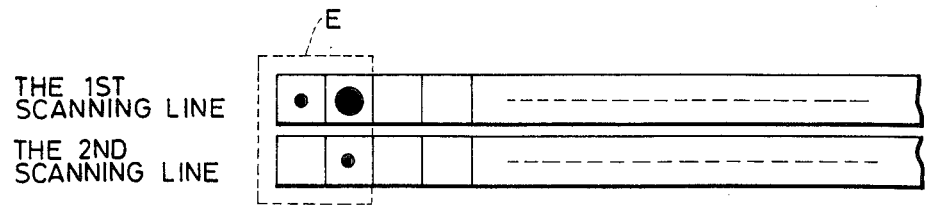
FIGS. 4(*a*) and (*b*) are diagrams illustrating a specific example of output information of the comparing circuit of FIG. 3 and an example of dot pattern based thereon, respectively.
Figure 4B:
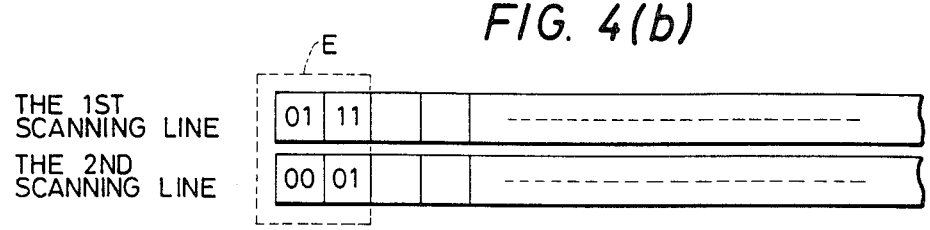

For example, as a result of a comparison between the supplied video signal and the Dither threshold value in the comparing circuit 1, if the first and second picture elements of first scanning line as well as the first and second picture elements of second scanning line are "half dot" and "full dot" as well as "not printed" and "half dot", respectively, as shown in FIG. 4(a), the bit output of the comparing circuit becomes "01, 11, . . ." and "00, 01, . . ." with respect to the first and second scanning lines as shown in FIG. 4(b).

Figure 1:
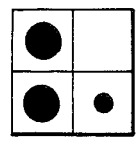
FIG. 1 is a diagram showing an example of 2×2 matrix in 3-level Dither method.
Figure 2:
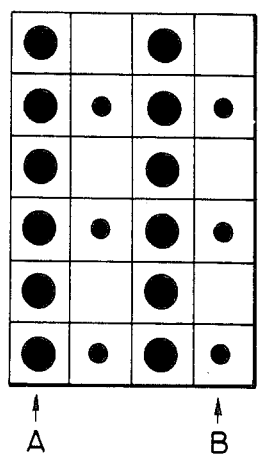
FIG. 2 is a diagram showing an example of picture the halftone of which is expressed by 2×2 matrix.

In this case of FIGS. 4(a) and (b), 2×2 matrix, i.e., picture element patterns as shown in FIGS. 1 and 2 are constructed by 4 picture elements or dots enclosed with a dotted line E, i.e., the first 2 dots of the first scanning line as well as the first 2 dots of the second scanning line. And, as is apparent from FIG. 4(b) and the above description, said 2×2 matrix is expressed by 8 bits.

In the comparing circuit 1, as described above, display or printing information (specifying information of full dot, half dot, and not printed) is converted into binary digital signals "1" and "0" and stored one by one in the memory 2 every scanning lines.

For instance, binary information of the first and second picture elements of the first scanning line, binary information of the first and second picture elements of the second scanning line, and . . . are selected from two continuous scanning line information in the memory 2 by means of a selector 3 to be read, and the resulting information of 2 dots per 1 scanning line, i.e., 4 bit information is transferred to a register 4. Thus 8 bit matrix information per one 2×2 matrix shown in FIG. 4(b) is stored in the register 4. In case of FIG. 4(b), for example, the information is contained in the register 4 in accordance with such order of "01" (the first picture element of the first scanning line), "00" (the first picture element of the second scanning line), "11" (the second picture element of the first scanning line), and "01" (the second element of the second scanning line).

Figure 7:
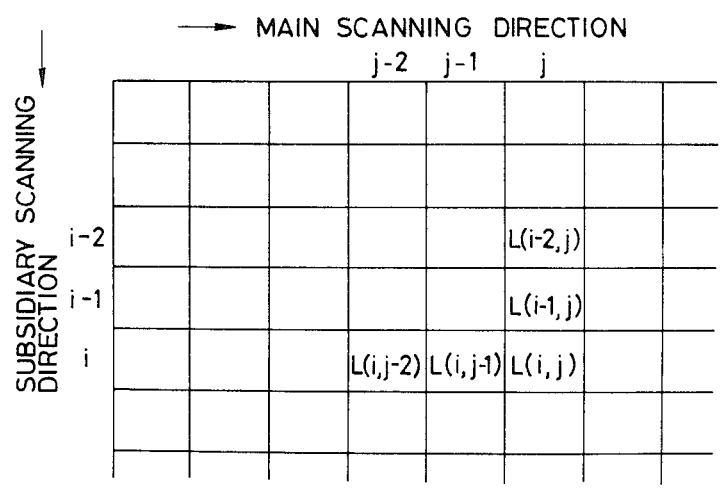
FIG. 7 is a conceptional diagram showing a positional relationship between attention matrix and the preceding matrices in main and subsidiary scanning directions.

First, second, and third line buffers 5, 6, and 7 have capacity for two scanning lines, i.e., 2×2N bits, respectively. The present raster information stored in the register 4 is transferred to a comparation/arithmetic circuit 8 and a CPU 9 with 8 bit unit (one 2×2 matrix unit). The information of 8 bit unit matrix which is now watched or to which attention is given is denoted by L (i, j) wherein i and j in parentheses are numbers or positions indicating 2×2 matrices, i.e., picture element patterns in subsidiary and main scanning directions, as is apparent from FIG. 7.

Furthermore the two preceding matrix information of the 2×2 matrix L (i, j) which is now watched in main scanning direction, i.e., L (i, j−2) and L (i, j−1) are inputted from the third line buffer 7 to the comparation/arithmetic circuit 8, and in addition the two preceding matrix information in subsidiary scanning direction, i.e., L (i−2, j) and L (i−1, j) are inputted from the first and second line buffers 5 and 6 to the circuit 8, respectively. In the comparation/arithmetic circuit 8, it is decided whether or not the 2×2 matrix information L (i, j) which is watched at present is identical with the respective two preceding matrix information in said main and subsidiary scanning directions, i.e., L (i, j−2), L (i, j−1), L (i−2, j), and L (i−1, j). The result decided is inputted to the CPU 9 through line x.

A specific example of construction of the comparation/arithmetic circuit 8 will be described hereinbelow by referring to FIG. 5. The comparation/arithmetic circuit 8 consists of eight exclusive OR circuits $8a_1$–$8a_8$ and four NOR gates $8b_1$–$8b_4$ involving two inputs connected to each output of said exclusive OR circuit, respectively. As is clear from FIG. 5, 8 bits of the 2×2 matrix or picture element pattern L (i, j) which is processed at present are inputted to one input terminal of each exclusive OR circuit whilst 8 bits of any one of said four past or preceding 2×2 matrices are inputted to the other input terminal. Every adjacent 2 bits of the output from the eight exclusive OR circuits $8a_1$–$8a_8$ are supplied to said four NOR gates $8b_1$–$8b_4$.

For instance, it is assumed that information of 8 bits (zero bit—the 7th bit) of matrix L (i, j) is inputted from the register 4 to either input terminal of each of said exclusive OR circuit $8a_1$–$8a_8$, and information of 8 bits (zero bit—the 7th bit) of matrix L (i−2, j) is inputted from the second line buffer 6 to the other input terminal.

It is to be noted that as the preceding 2×2 matrices in main and subsidiary scanning directions to be compared with said matrix L (i, j), e.g., 2×2 matrix L (i−1, j) from the first line buffer 5 as well as 2×2 matrices L (i, j−1) and L (i, j−2) from the third line buffer may also be used other than the aforesaid 2×2 matrix L (i−2, j) from the second line buffer 6. The 2×2 matrix L (i, j) being now watched is compared parallelly or successively with said respective past matrices.

In operation of the comparation/arithmetic circuit 8 shown in FIG. 5, if picture element of the preceding second 2×2 matrix L (i−2, j) viewed along the subsidiary scanning direction and picture element of 2×2 matrix L (i, j) included in the scanning line being watched at present are those shown in FIGS. 6(A) and (B), 8 bit information of the respective matrices is as follows:

L (i−2, j)=00111101

L (i, j)=00011101

Accordingly signals to be applied to the respective input terminals and signals generated at the respective output terminals of the exclusive OR circuits $8a_1$–$8a_8$ in the comparation/arithmetic circuit 8 are as indicated in the following Table 1.

TABLE 1

| Exclusive OR Circuit Input Terminal | $8a_1$ | $8a_2$ | $8a_3$ | $8a_4$ | $8a_5$ | $8a_6$ | $8a_7$ | $8a_8$ |
|---|---|---|---|---|---|---|---|---|
| Input Signal L(i-2,j) | 0 | 0 | 1 | 1 | 1 | 1 | 0 | 1 |
| Signal L(i,j) | 0 | 0 | 0 | 1 | 1 | 1 | 0 | 1 |
| Output of $8a_1 \sim 8a_8$ | 0 | 0 | 1 | 0 | 0 | 0 | 0 | 0 |
| Output of NOR Gates | 1 ($8b_1$) | | 0 ($8b_2$) | | 1 ($8b_3$) | | 1 ($8b_4$) | |

Meanwhile each output of the NOR gates becomes successively "1", "0", "1", "1" as indicated in Table 1.

In accordance with the present example, it will be apparent to exhibit that dots having the same density exist at corresponding positions of the two 2×2 matrices being compared in the case where output of the NOR gates $8b_1$–$8b_4$ is "1" and on the other hand, dots having different density exist in the case where said output is "0".

Figure 5:
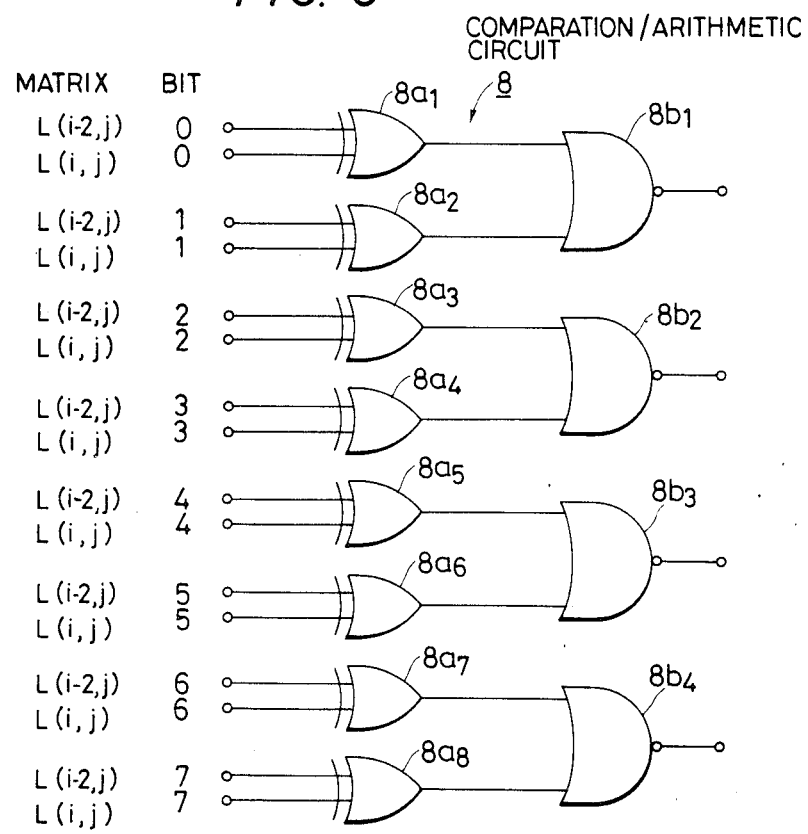
FIG. 5 is a circuit diagram illustrating a specific example of the comparation/arithmetic circuit of FIG. 3.

In the circuit example of FIG. 5, comparative results of 4 bits are thus obtained by means of a comparison between the 2×2 matrix which is now watched and one of the preceding 2×2 matrices. In the present embodiment, since one attention matrix is compared with the preceding four matrices being the nearest in main and subsidiary scanning directions, comparative results of 16 bits in total are obtained.

Referring again to FIG. 3, the comparative results of 16 bits are transferred to the CPU 9 through the line x. The CPU 9 detects how many "1" are in the comparative results of 16 bits, and if there are a predetermined number or more of "1", e.g., eight or more, i.e., half the aforesaid bits of "1", the CPU 9 rotates 8 bit information of the attention matrix inputted from the register 4 by 2 bits.

Figure 6:
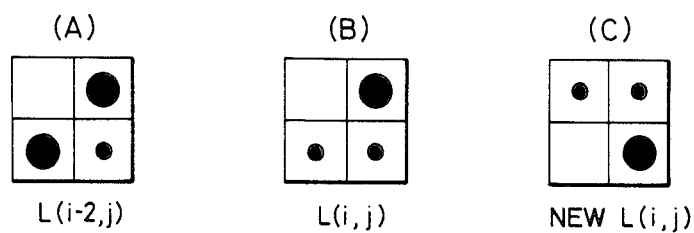
FIGS. 6(A), (B), and (C) are diagrams illustrating an example of the preceding 2×2 matrix L (i−2, j) and attention matrix L (i, j)

In the above example, for example, 8 bit information of the attention matrix L (i, j) which is "00011101", is rotated by 2 bits, in other words, the lowest 2 bits are shifted to the uppermost position to obtain "01000111", whereby the dot pattern of FIG. 6(B) is converted to that of FIG. 6(C). Thus the 8 bit information rotated is transferred from the CPU 9 through line y and contained in the third line buffer 7 as new L (i, j) at a prescribed position. As mentioned above, when the attention matrix L (i, j) is rotated by 2 bits, a state or disposition of dot patterns is changed so that consistency of said state can be reduced with respect to that of the preceding four attention dot patterns in view of probability.

In accordance with the manner as described above, bit information of 2×2 matrix L (i, j) including scanning lines or picture elements which are watched at present is decided and contained in the third line buffer 7 as mentioned above. When bit information for two scanning lines is decided, the resulting information is transferred to a memory 10 and the first line buffer 5 through line z, and at the same time bit information for the past two scanning lines which has been stored in the first line buffer 5 is transferred to the second line buffer 6.

A thermal head driving circuit 11 drives a thermal head 12 on the basis of the information stored in the memory 10 in accordance with a well known method. As a result, an ink donor film 13 is selectively heated, and image is transferred on a recording paper 14.

As described above, 2×2 matrix including scanning lines or picture elements being now watched is compared with the past (preceding) two each 2×2 matrices in the same main and subsidiary directions as those of the former 2×2 matrix in accordance with the present embodiment. As a result, a disposition of dot patterns of the 2×2 matrix which is watched at present can be changed so as not to coincide as far as possible dot patterns or picture element patterns forming the above said matrices with each other. Thus such expression in which an image portion of the same tone is reproduced by repeating the same picture element patterns is avoided so that quality of reproduced image can be improved.

Figure 8:
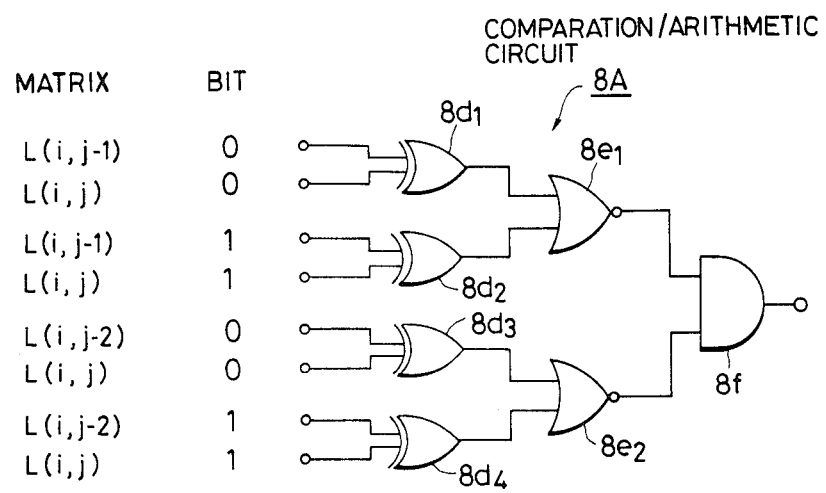
FIG. 8 is an alternative comparation/arithmetic circuit of FIG. 5.

In the above described embodiment, the past two each matrices, i.e., four matrices in total, which are the nearest in main and subsidiary scanning directions, are used with respect to one attention matrix, and similarity is inspected in every picture elements existing at positions corresponding to respective picture element patterns, so that comparative results of 16 bits are obtained. In order to reduce information content of the comparative results, a comparation/arithmetic circuit 8A having a construction as illustrated in FIG. 8 may be employed.

According to this comparation/arithmetic circuit 8A, information content of the comparative results is shortened to 8 bits. In this circuit 8A, 2 bit information at a particular position in the picture element pattern of the attention matrix L (i, j) (for example, position a in FIG. 9) is supplied to either of two each inputs of exclusive OR circuits $8d_1$ and $8d_2$ whilst 2 bit information at the corresponding position in the preceding matrix L (i, j−1) in main scanning direction (for example, position $a_1$ in FIG. 9) is supplied to the other two each inputs. Accordingly output of a NOR circuit $8e_1$ involving each output of said exclusive OR circuits $8d_1$ and $8d_2$ as two inputs indicates whether bit information of picture element a is identical with that of picture element $a_1$ (output is "1" in this case), or not (output is "0" in this case).

Furthermore, 2 bit information at the particular position in the picture element pattern of the attention matrix L (i, j) (for example, position a in FIG. 9) is supplied to either of two each inputs of exclusive OR circuits $8d_3$ and $8d_4$ whilst 2 bit information at the corresponding position in the second preceding matrix L (i, j−2) in main scanning direction (for example, position $a_2$ in FIG. 9) is supplied to the other two each inputs. Hence output "1", "0" of a NOR circuit $8e_2$ involving each output of said exclusive OR circuits $8d_3$ and $8d_4$ as two inputs indicates whether or not bit information of picture element a is identical with that of picture element $a_2$.

Figure 9:
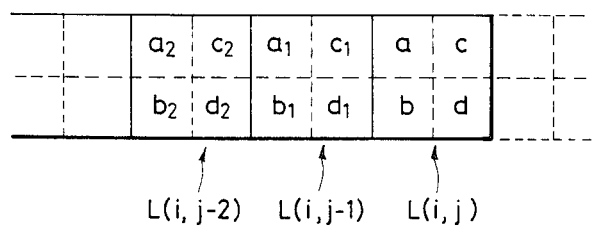
FIG. 9 is a conceptional diagram showing each positional relationship of picture elements between an attention matrix and the two preceding matrices in a main scanning direction.

Accordingly an output of an OR circuit $8f$ becomes "1" in the case where all the 2 bit information exhibiting said picture elements a, $a_1$, and $a_2$ in FIG. 9 are equal to each other whilst the said output becomes "0" in the case other than that described above.

Similar comparison is made upon other positions b, c, and d of picture element, besides similar comparison is made also on four picture element positions a, b, c, and d by employing the past two matrices in the subsidiary scanning direction as the object thereof.

In accordance with the above processing, eight comparative results are obtained, and if the comparative results "1" are the predetermined number or more, 8 bit information of attention matrix is rotated by 2 bits as mentioned similarly to the above.

While the above embodiment has been described in conjunction with an example wherein halftone is expressed in accordance with 3-level Dither method 2×2 matrix, the present invention is not limited thereto, but it can be applied to any method which utilizes a picture element pattern composed of a plurality of dots.

Further although two each preceding matrices to be compared are utilized in main and subsidiary directions, one or more than two matrices may also be utilized.

In place of 2 bit rotation as to attention matrix, 8 bit information of such attention matrix may be rearranged by utilizing two bits as a unit in accordance with a predetermined convention.

Moreover, after practicing 2 bit rotation or rearrangement of attention matrix with 2 bit unit, such attention matrix may be compared again with past one matrix or plural matrices in main and subsidiary scanning directions.

The present invention is not limited to thermal transfer printing devices, but it may also be applied to a recording method in which digital video signal is handled such as direct thermal recording method, electrostatic recording method, ink jet recording method, laser recording method and the like. In addition, the present invention can also be applied to tone reproduction in color display.

According to the present invention, since such probability that matrices composed of the same dot patterns exist in the vicinity along main and subsidiary directions of attention matrix becomes small, repetition of the same picture element pattern is avoided, so that quality of image is improved, whereby more excellent quality of image than that in conventional methods can be provided.

What is claimed is:

1. An apparatus for producing a half tone reproduction of an image in the form of a plurality of picture element patterns, each picture element pattern being composed of an n×m matrix of dots and each picture element pattern having a half tone level determined by a combination of densities of the n×m dots in that picture element pattern; the apparatus comprising:
    means for comparing a specific picture element pattern with at least one adjacent picture element pattern to determine whether an identity exists; and
    means for changing an arrangement of the dots which form the specific picture element pattern to yield a different dot disposition with an equivalent half tone level, prior to producing the half tone reproduction of the image, in a case when at least a predetermined number of adjacent picture element patterns are identical to the specific picture element pattern, to eliminate undesirable patterns which detract from visual quality of the half tone reproduction and which are caused by presence of identical picture element patterns adjacent one another.

2. The apparatus of claim 1 wherein the adjacent picture element pattern is positioned in front of the specific picture element pattern along a main scanning direction.

3. The apparatus of claim 1 wherein the adjacent picture element pattern is positioned in front of the specific picture element pattern along a subsidiary scanning direction.

4. The apparatus of claim 1 wherein at least one adjacent picture element pattern includes a picture element pattern positioned in front of the specific picture element pattern in a main scanning direction and a picture element pattern positioned in front of the specific picture element pattern in a subsidiary scanning direction.

5. An image display unit capable of half tone reproduction wherein said image is reproduced by means of a picture element pattern composed of an n×m matrix of dots as a unit and each dot display density (including 0) of said respective dots is stepwisely controlled, which comprises:
    a means for determining the display density of the respective dots composing said picture element in response to intensity of a read signal in every picture element,
    means for comparing a specific picture element pattern composed of the dots (each display density of which is determined by said means for determining) with at least one adjacent picture element pattern to said specific picture element pattern, and
    a means for changing the disposition of individual dots in said specific picture element pattern to yield a different dot disposition with an equivalent half tone level in a case when a predetermined number of identical picture element patterns with said specific picture element pattern are in said adjacent picture element patterns.

6. An image display unit capable of half tone reproduction as claimed in claim 5 wherein said adjacent picture element patterns are the preceding one picture element pattern or a plurality of picture element patterns positioned in front of said specific picture element pattern along a main scanning direction.

7. An image display unit capable of half tone reproduction as claimed in claim 5 wherein said adjacent picture element patterns are a preceding one picture element pattern or a plurality of picture element patterns positioned in front of said specific picture element pattern along a subsidiary scanning direction.

8. An image display unit capable of half tone reproduction as claimed in claim 5 wherein said adjacent picture element patterns are a respective preceding one picture element pattern or respective plural picture element patterns positioned in front of said specific picture element pattern along main and subsidiary scanning directions, respectively.

9. An image display unit capable of half tone reproduction as claimed in claim 5 wherein changing the disposition of dots in said specific picture element pattern is a rearrangement of positions of the respective dots in accordance with a predetermined order.

10. An image display unit capable of half tone reproduction as claimed in claim 5 wherein picture element patterns are compared with each other in such a manner that display density of the respective dots located at corresponding positions in two picture element patterns is individually compared with each other, and when the display density of all the dots located at corresponding positions is equal to each other, such conclusion that said two picture element patterns are equal is drawn.

11. An image display unit capable of half tone reproduction as claimed in claim 1 wherein determination of display density of the respective dots composing a picture element pattern is carried out in accordance with a Dither method.

* * * * *